(12) United States Patent
Lertrattanapanich et al.

(10) Patent No.: US 7,711,204 B2
(45) Date of Patent: May 4, 2010

(54) 1-D IMAGE RESTORATION USING A SLIDING WINDOW METHOD

(75) Inventors: Surapong Lertrattanapanich, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1402 days.

(21) Appl. No.: 11/121,817

(22) Filed: May 2, 2005

(65) Prior Publication Data

US 2006/0245667 A1   Nov. 2, 2006

(51) Int. Cl.
*G06K 9/40*   (2006.01)

(52) U.S. Cl. ................ 382/264; 382/280; 382/262; 382/141; 382/254; 382/282; 382/299; 382/275; 345/581; 345/639; 715/856

(58) Field of Classification Search .............. 382/275, 382/262, 299
See application file for complete search history.

(56) References Cited

U.S. PATENT DOCUMENTS

| | | | |
|---|---|---|---|
| 5,627,918 A | | 5/1997 | Carasso |
| 5,892,853 A * | | 4/1999 | Hirani et al. ............... 382/280 |
| 5,974,194 A * | | 10/1999 | Hirani et al. ............... 382/262 |
| 6,266,054 B1 * | | 7/2001 | Lawton et al. ............. 345/581 |
| 6,348,936 B1 * | | 2/2002 | Berteig ...................... 715/856 |
| 6,587,592 B2 * | | 7/2003 | Georgiev et al. ........... 382/254 |
| 6,658,166 B1 * | | 12/2003 | Zlotnick et al. ............ 382/282 |
| 6,711,302 B1 * | | 3/2004 | Lee ............................ 382/275 |
| 6,751,342 B2 * | | 6/2004 | Shepard .................... 382/141 |
| 7,012,624 B2 * | | 3/2006 | Zhu et al. .................. 345/639 |
| 2002/0172410 A1 * | | 11/2002 | Shepard .................... 382/141 |
| 2004/0151401 A1 * | | 8/2004 | Sawhney et al. .......... 382/299 |

OTHER PUBLICATIONS

R. C. Gonzalez and R. E. Woods, *Digital Image Processing*, Addison Wesley, 1993.
J. S. Lim, *Two Dimensional Signal and Image Processing*, Prentice Hall, 1990.
H. C. Andrews and B. R. Hunt, *Digital Image Restoration*, Prentice Hall, 1977.
M. R. Banham and A. K. Katsaggelos, Digital Image Restoration, *IEEE Signal Processing Magazine*, Mar. 1997, pp. 24-41.

(Continued)

*Primary Examiner*—Samir A Ahmed
*Assistant Examiner*—Tsung-Yin Tsai
(74) *Attorney, Agent, or Firm*—Kenneth L. Sherman, Esq.; Michael Zarrabian, Esq.; Myers Andras Sherman LLP

(57) ABSTRACT

A method of image restoration in an image processing system is provided. An observed image of an original image, wherein the observed image comprises multiple samples, is received. For a selected sample from the multiple samples, a subset of the multiple samples is selected, wherein said subset includes the selected sample. Image restoration to restore an original image sample from the selected sample is performed as a function of said subset of multiple samples, and not the entire observed image. A novel image restoration method which requires shorter length FFT calculation in the image restoration process is utilized, wherein the resulting restored image maintains the same quality as the result from conventional approaches.

8 Claims, 3 Drawing Sheets

OTHER PUBLICATIONS

M. H. Hayes, *Schaum's Outline: Digital Signal Processing*, McGraw Hill, 1999.

Linear Shift Invariant (LSI), http://rkb.home.cern.ch/rkb/AN16pp/node159.html, Apr. 7, 1998.

* cited by examiner

1-D IMAGE RESTORATION USING A SLIDING WINDOW METHOD

FIELD OF THE INVENTION

The present invention relates to the field of image processing, and more particularly to a method of restoring original 1-D image from a degraded (blurred and noisy) observed one dimensional (1-D) image using a sliding window method.

BACKGROUND OF THE INVENTION

In digital image processing applications, image restoration is usually used for restoring an original image from a blurred and noisy observed image where prior knowledge of the system point spread function (PSF) or blurring function is available. Image restoration can be applied to numerous applications including astronomy, medical imaging, military surveillance, and digital television (DTV).

The conventional one dimensional image restoration based on "regularized least square" requires the calculation of fast Fourier transform (FFT) of the observed image and the system PSF. Then, complex divisions and multiplications between the FFTs of the observed image and the system PSF are performed in frequency domain and the result is further processed by inverse FFT (IFFT) to obtain the restored image in spatial domain.

A discrete model for a 1-D linear shift invariant (LSI) image acquisition (including degradations caused by a PSF and additive noise) can be given by defined as:

$$g[n] = \sum_{k=0}^{N-1} h[n-k]f[n] + v[n] \quad \text{for } n = 0, 1, 2, \ldots, N-1, \quad (1)$$

wherein g[n] is a degraded (blurred and noisy) observed image of length N, f[n] represents an original image, h[n] is the system PSF (assumed to be known), and v[n] is an additive noise introduced by system. Let H(u) and G(u) denote the FFTs of the system PSF and observed image, respectively. The restored image R(u) in the frequency domain based on regularized least square can be expressed as:

$$R(u) = \left[\frac{H^*(u)}{H^*(u)H(u) + \gamma}\right] G(u) \quad \text{for } u = 0, 1, \ldots, N-1. \quad (2)$$

The superscript * in the preceding equation is the complex conjugate operator and constant γ is commonly referred to as the regularization parameter, which helps control the tradeoff between fidelity of the observed data and the smoothness of the solution. The restored image in spatial domain r[n] can be calculated using the IFFT of the result in relation (2) above.

It is known that the highest complexity of this conventional image restoration is due to the calculation of FFT and its inverse counterpart of the same length N as the observed image. In practice, the implementation of FFT of the same length as the observed image is complicated and difficult in hardware design. Further, generally the image length N is not a power of 2. Therefore, calculation of FFT of such length generally cannot be performed in an efficient manner.

BRIEF SUMMARY OF THE INVENTION

The present invention addresses the above shortcomings. An object of the present invention is to provide an alternative image restoration method which requires the calculation of FFT of shorter length instead of the same length as the observed image while quality of the resulting restored image remains essentially the same as the result from the conventional approaches.

In one embodiment, the present invention provides an image restoration process using a sliding window, including the steps of: (a) for each sample of observed image, constructing a window of length W whose center is at the considered observed sample, (b) performing a W-point FFT of the resulting window to obtain its frequency domain, (c) calculating the restored window in frequency domain based on the knowledge of both regularization parameter and the system PSF in frequency domain, (d) performing a W-point IFFT of the restored window in frequency domain to obtain the restored window in the spatial domain, and (e) extracting the centered sample of the resulting restored window and assigning its pixel value to the restored sample corresponding to the considered input observed sample.

Other features and advantages of the present invention will be apparent from the following specifications taken in conjunction with the following drawings.

DETAILED DESCRIPTION OF THE INVENTION

Example embodiments of image restoration according to the present invention are described below with reference to the accompanying drawings. Prior to the description of the image restoration using sliding window according to the present invention, a conventional image restoration process is briefly explained in relation to process 100 in FIG. 1 to enhance understanding of the image restoration process of the present invention.

Figure 1:
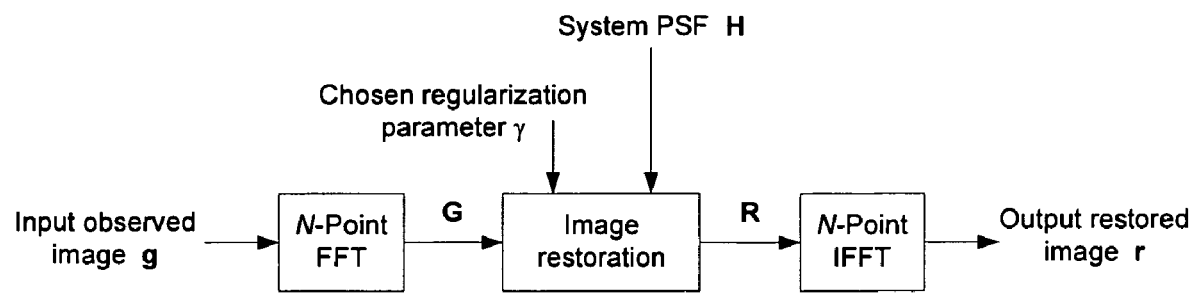
FIG. 1 shows a conventional image restoration process.

In the conventional image restoration of FIG. 1, the input is the observed image of length N samples and the output is the restored image of the same length. Assume that the knowledge the system PSF (in frequency domain) H={H[0], H[1], ..., H[N−1]} is available. In FIG. 1, g={g[0], g[1], g[2], ..., g[N−1]} denotes the input observed 1-D image of length N. The observed image in frequency domain G={G[0], G[1], G[2], ..., G[N−1]} is calculated by use of N-point FFT to the observed image g.

Next, based on the chosen regularization parameter γ, the image restoration process is performed by calculating each frequency component R[u], for u=0, 1, 2, ..., N−1, of the restored image R={R[0], R[1], R[2], ..., R[N−1]} according to relation (2) above. Then, the application of N-point IFFT to the frequency domain of restored image R results in the restored image in spatial domain r={r[0], r[1], r[2], ..., r[N−1]}.

It is noted that the conventional image restoration is an image-based processing and the highest complexity of calculation is due to the FFT of the same length N as the observed image g, which is usually a large integer and not a power of 2.

In practice, such a large number N results in a complex hardware implementation.

An image restoration process according to the present invention limits the number of samples in the calculation of FFT within a smaller window of length W, wherein W is chosen to be a small integer and a power of 2. The window contains a subset of the samples of the input image.

As such, a sliding window process is applied to the image restoration problem according to the present invention. It is also worth noting that the chosen value of W must be larger than the support of the system PSF in spatial domain (i.e., the number of nonzero sample values of the system PSF), such that all of system PSF samples can be taken into account without any truncation. Unlike the conventional image restoration, the image restoration using sliding window according to the present invention provides pixel-based processing instead of image-based processing.

Figure 2:
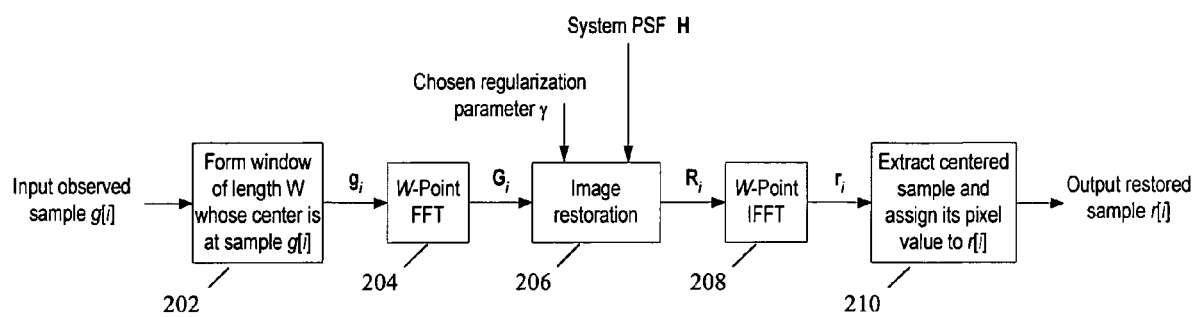
FIG. 2 shows a block diagram of an image restoration system using a sliding window method according to an embodiment of the present invention.

FIG. 2 shows a block diagram of an example image restoration system 200 according to an embodiment of the present invention using a sliding window method. The system 200 includes the following components: (1) a window generator 202 that forms a window of length W whose center is g[i], (2) an FFT block 204 that performs a W-point FFT process, (3) an image restoration block 206 that performs image restoration, (4) an IFFT block 208 that performs a W-point IFFT process, and (5) and extractor 210 that extracts centered sample and assigns it to pixel value of restored sample. The functions of the components of the system 200 are described below.

The input to the window generator 202 is considered an observed sample at index i, $0 \leq i < N$, and the output of the extractor block 210 is the restored sample corresponding to the same index i as input. For each input 1-D observed sample g[i], i=0, 1, 2, ..., N−1, a window of length W is constructed by the window generator 202, where the location of the window center is at the observed sample g[i]. The resulting window $g_i$ contains W consecutive samples of observed image starting from g[i−W/2] to g[i+W/2−1].

Specifically, the resulting window $g_i$={g[i−W/2], g[i−W/2+1], ..., g[i−1], g[i], g[i+1], ..., g[i+W/2−1]}. In the case where the index of elements in g is out of the image boundary (i.e., g[k] where k<0 or k>N−1), the periodic image boundary condition is used. It is noted that because the window length W is typically selected to be a power of 2, it is divisible by 2 (and W/2 is an integer).

Once the window $g_i$ is constructed in the window generator 202, calculation of the restored window $r_i$ is performed in the same fashion as the conventional image restoration process, however the input is window $g_i$ instead of observed image g and the output is restored window $r_i$ instead of restored image r.

Specifically, after the window $g_i$ is formed, it is input to the W-point FFT block 204, resulting in the frequency domain of the window, $G_i$={$G_i$[0], $G_i$[1], ..., $G_i$[W−1]}. Next, the image restoration process is performed in the image restorer 206 by calculating each frequency component $R_i$[u], for u=0, 1, 2, ..., W−1, of the restored window $R_i$={$R_i$[0], $R_i$[1], $R_i$[2], ..., $R_i$[N−1]} similar to relation (2) above, where:

$$R_i(u) = \left[\frac{H^*(u)}{H^*(u)H(u) + \gamma}\right] G_i(u) \text{ for } u = 0, 1, \ldots, W-1. \quad (3)$$

Thereafter, the spatial domain of the restored window $r_i$ is obtained by calculating the W-point IFFT of $R_i$ in the IFFT block 208. Then, only the pixel value of the centered sample of the restored window $r_i$ is extracted and assigned to the restore sample r[i] by the extractor 210. The whole process is repeated from beginning till the last observed sample g[N−1] is restored.

Figure 3:
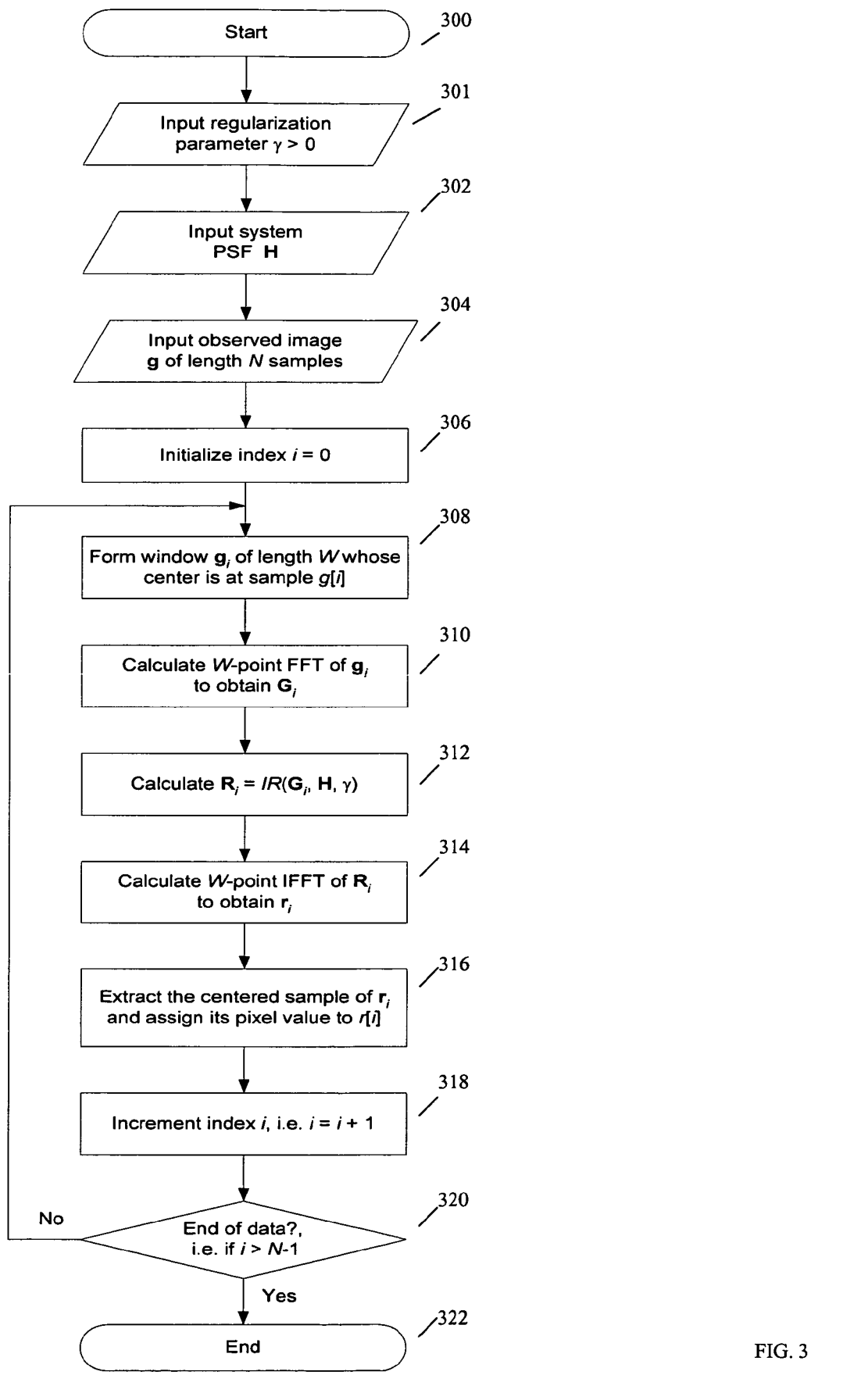
FIG. 3 shows a flowchart of the steps of an embodiment of an image restoration process using a sliding window method according to the present invention.

FIG. 3 shows a flowchart of the steps of an embodiment of an image restoration process using sliding windows implemented in the system of FIG. 2, according to an embodiment of the present invention. The process in FIG. 3 includes the following steps:

Start (step 300).
Input regularization parameter γ>0 (step 301).
Input system PSF H (step 302).
Input observed image g of length N samples (step 304).
Initialize index i=0 (step 306).
Form window $g_i$ of length W whose center is at sample g[i] (step 308).
Calculate W-point FFT of $g_i$ to obtain $G_i$ (step 310).
Calculate $R_i$=IR($G_i$, H, γ) according to relation (3) above (step 312).
Calculate W-point IFFT of $R_i$ to obtain $r_i$ (step 314).
Extract the centered sample of $r_i$ and assign its pixel value to r[i] (step 316).
Increment index i (i.e., i=i+1) (step 318).
Determine if end of data (i.e., i>N−1)? (step 320), if not go back to step 308, otherwise, End (step 322).

In the example described herein, the window length is selected to be W=16 because it is a small integer that is a power of 2, and allows more efficient computations than a typical radix-2 FFT approach using composite number FFT algorithm. Further, the inventors have found that such a selection allows a more efficient computation of FFT than a typical radix-2 FFT approach using the composite number FFT algorithm.

Because the integer number 16 can be factored into 4×4, the FFT of length 16 can be decomposed into a plurality of FFTs of length 4 whose FFT computation does not require any complex multiplication, and only 12 complex additions are needed. The implicit complex multiplications by ±j, where j is the imaginary unit in complex number system, in FFT of length 4 only requires interchanging real and imaginary parts and possibly changing a sign bit. As those skilled in the art will recognize, other values for W are also possible, and are contemplated by the present invention.

The image restoration using sliding window according to the present invention is appropriate for DTV applications since image formation in DTV is achieved by using a stack of 1-D horizontal scan lines from top to bottom. Therefore, each scan line can be treated as 1-D image in the present invention and can be restored independently. As a result, an image restoration using a sliding window method according to the present invention, can be directly applied to the interlaced video input since the interlaced video input each alternate scan line comes from different time instant.

Other types of image boundary conditions such as replicate and mirror image boundary conditions can be used instead of periodic image boundary condition. As those skilled in the art will recognize, a generalization of the present invention from 1-D to two dimensional (2-D) case can be performed wherein the window construction process, instead of forming a 1-D window of length W about the considered observed sample, a 2-D window of size $W_1 \times W_2$ samples can be used. Additionally, all 1-D FFTs and IFFTs are replaced with their 2-D counterparts. As such, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of image restoration in an image processing system, comprising:
   employing an imaging processing system for:
      receiving an observed image of an original image, wherein the observed image comprises multiple consecutive samples;
      for a selected sample from the multiple consecutive samples, selecting a subset of the multiple consecutive samples, wherein said subset includes the selected sample, and selecting a subset of the multiple consecutive samples further includes selecting a window having W consecutive samples therein, such that the selected sample is at the center of said window; and
   performing image restoration to restore an original image sample from the selected sample as a function of said subset of multiple consecutive samples, wherein performing image restoration further includes performing a W-point FFT of the window to obtain frequency domain values wherein the FFT is performed for each of the W consecutive samples contained within the window, and calculating a restored window in frequency domain using the frequency domain values, wherein calculating the restored window in frequency domain further includes determining a frequency component $R_i[u]$, for $u=0, 1, 2, \ldots, W-1$, of the restored window $R_i = \{R_i[0], R_i[1], R_i[2], \ldots, R_i[N-1]\}$ where:

$$R_i(u) = \left[\frac{H^*(u)}{H^*(u)H(u) + \gamma}\right] G_i(u) \text{ for } u = 0, 1, \ldots, W-1,$$

where $H(u)$ is a FFT of a system Point Spread Function,
$H^*(u)$ is the complex conjugate of $H(u)$,
$G_i(u)$ is the frequency domain value,
$\gamma$ is a regularization parameter, and
   $N$ is a length of the observed image $g[N]$.

2. The method of claim 1 wherein performing image restoration further includes performing a W-point IFFT of the restored window to obtain a resulting restored window in the spatial domain.

3. The method of claim 2 wherein performing image restoration further includes extracting a centered sample in said resulting restored window, and assigning the pixel value of said centered sample as a restored sample corresponding to the selected input sample.

4. The method of claim 1 wherein the window comprises a 1-D window.

5. The method of claim 1 wherein the window comprises a 2-D window.

6. A method of image restoration in an image processing system, comprising:
   employing an image processing system for:
      receiving an observed image of an original image, wherein the observed image comprises a stack of 1-D horizontal scan lines from top to bottom, each scan line comprising multiple consecutive samples;
      for each scan line:
         selecting a sample from the multiple consecutive samples, and selecting a subset of the multiple consecutive samples including the selected sample; and
      performing image restoration to restore an original image sample from the selected sample as a function of said subset of multiple consecutive samples, wherein selecting a subset of the multiple consecutive samples further includes selecting a window having a length W of consecutive samples therein, such that the selected sample is at the center of said window, and performing image restoration further includes:
         performing a W-point FFT of the window to obtain frequency domain values wherein the FFT is performed for each of the W consecutive samples contained within the window; calculating a restored window in frequency domain using the frequency domain values, wherein calculating the restored window in frequency domain further includes determining a frequency component $R_i[u]$, for $u=0, 1, 2, \ldots, W-1$, of the restored window $R_i = \{R_i[0], R_i[1], R_i[2], \ldots, R_i[N-1]\}$ where:

$$R_i(u) = \left[\frac{H^*(u)}{H^*(u)H(u) + \gamma}\right] G_i(u) \text{ for } u = 0, 1, \ldots, W-1,$$

where $H(u)$ is a FFT of a system Point Spread Function,
$H^*(u)$ is the complex conjugate of $H(u)$.
$G_i(u)$ is the frequency domain value,
$\gamma$ is a regularization parameter, and
$N$ is a length of the observed image $g[N]$;
performing a W-point IFFT of the restored window to obtain a resulting restored window in the spatial domain; and
extracting a centered sample in said resulting restored window, and assigning the pixel value of said centered sample as a restored sample corresponding to the input sample.

7. A method of image restoration in an image processing system, comprising:
   employing an image processing system for:
      receiving an observed image of an original image, wherein the observed image comprises multiple consecutive samples; and
   performing image restoration to restore the original image from the observed image samples using a sliding window of a subset of the multiple consecutive samples, wherein the sliding window comprises a window having W consecutive samples therein, such that a selected sample is at the center of the sliding window, and performing image restoration further includes:
      performing a W-point FFT of the sliding window to obtain frequency domain values wherein the FFT is performed for each of the W consecutive samples contained within the sliding window, and
      calculating a restored window in frequency domain using the frequency domain values, wherein calculating the restored window in frequency domain further includes determining a frequency component $R_i[u]$, for $u=0, 1, 2, \ldots, W-1$, of the restored window $R_i = \{R_i[0], R_i[1], R_i[2], \ldots, R_i[N-1]\}$ where:

$$R_i(u) = \left[\frac{H^*(u)}{H^*(u)H(u) + \gamma}\right] G_i(u) \text{ for } u = 0, 1, \ldots, W-1,$$

where H(u) is a FFT of a system Point Spread Function.
H*(u) is the frequency domain value,
$G_i(u)$ is the frequency domain value,
γ is a regularization parameter, and
N is a length of the observed image g[N];

performing a W-point IFFT of the restored window to obtain a resulting restored window in the spatial domain; and extracting a centered sample in said resulting restored window, and assigning the pixel value of said centered sample as a restored sample corresponding to the input sample.

8. The method of claim 7 wherein further comprising:

incrementing the index of the sliding window by one; and, if the index of the sliding window is not greater than N−1, performing image restoration to further restore the original image from the observed image samples using a sliding window of the next subset of the multiple consecutive samples.

* * * * *